US 7,814,549 B2

(12) United States Patent
Park

(10) Patent No.: US 7,814,549 B2
(45) Date of Patent: Oct. 12, 2010

(54) DIRECT PROCESS ACCESS

(75) Inventor: Seung Bae Park, Lidcombe (AU)

(73) Assignee: Symantec Corporation, Mountain View, CA (US)

(*) Notice: Subject to any disclaimer, the term of this patent is extended or adjusted under 35 U.S.C. 154(b) by 1104 days.

(21) Appl. No.: 11/499,463

(22) Filed: Aug. 4, 2006

(65) Prior Publication Data

US 2008/0046977 A1 Feb. 21, 2008

Related U.S. Application Data

(60) Provisional application No. 60/835,417, filed on Aug. 3, 2006.

(51) Int. Cl.
*G06F 12/14* (2006.01)
(52) U.S. Cl. .................. 726/24; 726/22; 726/23; 726/25
(58) Field of Classification Search .............. None
See application file for complete search history.

(56) References Cited

U.S. PATENT DOCUMENTS

| | | | |
|---|---|---|---|
| 7,571,482 B2 * | 8/2009 | Polyakov et al. | 726/24 |
| 2004/0168173 A1 * | 8/2004 | Cohen et al. | 719/310 |
| 2005/0193173 A1 * | 9/2005 | Ring et al. | 711/118 |
| 2005/0204205 A1 * | 9/2005 | Ring et al. | 714/47 |
| 2006/0206937 A1 * | 9/2006 | Repasi et al. | 726/22 |
| 2007/0022287 A1 * | 1/2007 | Beck et al. | 713/164 |
| 2007/0067844 A1 * | 3/2007 | Williamson et al. | 726/24 |
| 2007/0078915 A1 * | 4/2007 | Gassoway | 707/205 |
| 2007/0208689 A1 * | 9/2007 | Park | 707/1 |
| 2007/0271610 A1 * | 11/2007 | Grobman | 726/22 |
| 2008/0022129 A1 * | 1/2008 | Durham et al. | 713/189 |

OTHER PUBLICATIONS

MicrosoftPress ("Microsoft Computer Dictionary", 5th edition, Microsoft Press ISBN-10: 0-7356-1495-4, May 2002).*
Battistoni (Roberto Battisoni, Emanuele Gabrielli, and Luigi V. Mancini, "A Host Intrusion Prevention System for Windows Operating Systems", ESROCS 2004, LNCS 3193, pp. 352-368, Sep. 2004).*
Grattan (Nick Grattan and Marshall Brain, Windows® CE 3.0 Application Programming, Prentice Hall, ISBN-10: 0-13-025592-0, Oct. 2000).*
Pelaez (Raul Siles Pelaez, Linux kernel rootkits: protecting the system's "Ring-Zero", SANS Institute, May 2004).*

(Continued)

*Primary Examiner*—Kambiz Zand
*Assistant Examiner*—Peter Poltorak
(74) *Attorney, Agent, or Firm*—Holland & Hart LLP

(57) ABSTRACT

A method, computer program product and system for obtaining notification information about the state of an operating system. The method includes the steps of receiving, by a Direct Process Access (DPA) engine, a request for the notification information from a requesting program. The notification information is obtained from a database associated with the DPA engine and the notification information is provided to the requesting program. The DPA engine receives update information indicative of changes in the notification information directly from the operating system and causes the notification information to be updated in the database.

19 Claims, 3 Drawing Sheets

OTHER PUBLICATIONS

Rutkowska (Joanna Rutkowska, "Concepts for the Stealth Windows Rootkit", (The Chameleon Project) Sep. 2003).*
Florio (Elia Florio, "When Malware Meets Rootkits", Symantec Security Response originally published by Virus Bulletin, Dec. 2005).*

Berg, "Security tips: Threat Monitor, The Root of the Root Kit", www.searchsecurity.techtarget.com Jul. 6, 2005.
Dillard "Microsoft Security News: What are user-mode vs. kernel-mode rootkits?" www.searchwindowssecurity.com May 6, 2005.
"Rootkit", www.en.wikipedia.org Mar. 1, 2006.

* cited by examiner

DIRECT PROCESS ACCESS

CROSS-REFERENCE TO RELATED APPLICATIONS

This application claims the benefit of priority from Provisional Application Ser. No. 60/835,417, filed Aug. 3, 2006 entitled Direct Process Access

TECHNICAL FIELD

The present invention generally relates to the field of computing and malicious software or software threats, such as for example rootkits, and more particularly to a method, system, computer readable medium of instructions and/or computer program product for providing a form of direct access to an operating system so as to obtain a true process or module list.

BACKGROUND ART

As used herein a "threat" includes malicious software, also known as "malware" (a portmanteau word of "malicious software") or "pestware", which includes software that is included or inserted in a part of a processing system for a harmful purpose. The term threat should be read to include both possible, potential and actual threats. Types of malware can include, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

One of the major features in security programs is to obtain snapshots of the currently running process list and run-time module list in order to detect processes and modules that are already running in the computer. In order to enhance stealth capabilities of malware, malware authors are employing more advanced stealth methods or software, called rootkits, so that normal programs that utilize an operating system API (Application Programming Interface) or third party library are unable to detect and remove threats or malware.

Rootkits intercept control transfer while sitting alongside an execution path to obtain snapshots and return forged information to a security program. Also, an operating system's kernel data can be modified if the rootkit is implemented as a kernel driver.

Normally rootkits are used in combination with detectable malware. As a result the number of malwares that a normal scan by a security program does not detect is increasing. This is a serious problem because this makes the security program believe malware does not exist in a particular system, thus leaving the system open to malicious activities.

A rootkit is a set of software tools frequently used by an intruder after gaining access to a computer system. These software tools are intended to conceal running processes, files or system data, which helps an intruder maintain covert or furtive access to a computer system. A rootkit is not a virus or trojan. Viruses modify a computer system file to propagate itself. Trojans masquerade as software and provide access for a hacker. Both of these techniques are susceptible to detection.

In contrast, a rootkit is intended to allow an intruder access to a computer system without leaving any trace. The term "kit" is used because software components work collectively to achieve the desired covertness or furtiveness. A rootkit can include additional software components for other malicious behaviour, such as "key loggers" and "packet sniffers".

In order to further enhance stealth capabilities of rootkits, the authors of rootkits are employing more advanced stealth methods so that normal programs that utilise operating system (Application Programming Interfaces) APIs or third party libraries are unable to detect and remove rootkits.

Presently, the stealth of a rootkit and the access to computer systems or operating systems which can be exploited present a significant security threat to computer systems and networks. Often rootkits are used in combination with otherwise normally detectable threats or malware. As a result, the number of threats or malware that normal malware scanning software does not detect is increasing.

Rootkits are generally classified into two categories: (1) user mode (or application level mode) or (2) kernel mode. The former involves elementary binary file replacement while the latter embeds itself intricately into the operating system. Kernel level rootkits add additional code and/or replace a portion of kernel code with modified code to help hide a backdoor on a computer system. This is often accomplished by adding new code to the kernel via a device driver or loadable module, such as Loadable Kernel Modules in the Linux operating system or device drivers in the Windows operating system. Kernel rootkits commonly patch, hook, or replace system calls with versions that hide information about the attacker. Application level, or user mode, rootkits may replace regular application binaries with Trojan fakes, or they may modify the behaviour of existing applications using hooks, patches, injected code, or other means. Kernel rootkits can be especially dangerous because they can be difficult to detect.

There are inherent limitations to any program that attempts to detect rootkits. Rootkits are collections of programs which can modify the tools or libraries upon which programs on the system depend. Some rootkits can modify the running kernel. A problem with rootkit detection is that the operating system cannot be trusted.

There are many user mode rootkits that intercept Win32 API functions using code injection and return false snapshot information to user mode application programs. Also there are instances of kernel rootkits directly modifying the operating system data structure at an arbitrary time to hide malware processes. This is called Direct Kernel Object Manipulation (DKOM).

DKOM relies upon the fact that the operating system creates kernel objects for bookkeeping and auditing. If a rootkit modifies these kernel objects, the rootkit can subvert what the operating system believes exists on the system. By modifying a token object, the rootkit can alter who the operating system believes performed a certain action, thereby subverting any logging. For example, the "FU rootkit" modifies the kernel object that represents the processes on the system. All the kernel process objects are linked. When a user process such as TaskMgr.exe queries the operating system for the list of processes through an API, Windows walks the linked list of process objects and returns the appropriate information. The FU rootkit unlinks the process object of the process it is hiding. Therefore, as far as many applications are concerned, the process does not exist.

Process:

A process is at least one of a running software program or other computing operation, or a part of a running software program or other computing operation, that performs a task. A process is a running instance of a program, including all variables and other states. A multitasking operating system may switch between processes to give the appearance of many processes executing concurrently or simultaneously, though in fact only one process can be executing at any one time per CPU thread.

Module:

A module is a software entity that groups a set of subprograms and data structures. Modules are units that can be compiled separately, which makes modules reusable and allows more than one programmer to work on different modules simultaneously. For example, in Microsoft Windows®, a module could be an executable program, a DLL (Dynamic Link Library), or a kernel driver.

Kernel Mode:

The kernel mode refers to one of the CPU (Central Processing Unit) modes that provides completely unrestricted operation of the CPU. In kernel mode, the CPU may perform any operation provided for by its architecture. Any instruction may be executed, any I/O (Input/Output) operation may be initiated, any area of memory may be accessed, etc.

User Mode:

The user mode refers to one of the CPU modes that has limited operation of the CPU. In user mode, certain restrictions on CPU operations are enforced by hardware. Typically, certain instructions are not permitted, I/O operations may not be initiated and some areas of memory cannot be accessed, etc. Usually the user mode capabilities of the CPU are a subset of the kernel mode capabilities, but in some cases (such as hardware emulation of non-native architectures), they may be significantly different from kernel capabilities, and not just a subset of them.

Kernel Driver:

A kernel driver is a specific type of software running in kernel mode, typically developed to control software and hardware devices or to provide security both for user mode application programs and the operating system.

Hash Table:

A hash table, or a hash map, is a data structure that associates keys with values. The primary operation a hash table supports is a lookup: given a key (e.g. a person's name), find the corresponding value (e.g. that person's telephone number). This works by transforming the key using a hash function into a hash, a number that the hash table uses to locate the desired value.

Hash Function:

A hash function (or Message Digest (MD)) is a technique used to establish whether a file transmitted over a network has been tampered with. A hash function uses a mathematical rule which, when applied to the file, generates a number, usually between 128 and 512 bits. This number is then transmitted with the file to a recipient who reapplies the mathematical rule to the file and compares the resulting number with the original number. If the resulting number and the original number are the same then there is a high probability that the message has not been tampered with, otherwise it is probable that the message has been tampered with.

Filter Program:

A filter program is a program that takes control of the execution of a program, and that can monitor, redirect, alter the execution path, or forge the result. A filter program can be located anywhere between one or more programs, for example in an operating system, and a file system(s). A filter program may be part of a rootkit.

File System:

A file system is a system for organising directories and files, generally in terms of how the file system is implemented in the operating system. File systems may, but need not necessarily, use a storage device, such as a hard disk, or they may be virtual and exist only as an access method for virtual data or for data over a network. More formally, a file system is a set of abstract data types that are implemented for the storage, hierarchical organisation, manipulation, navigation, access, and retrieval of data. File systems need not make use of a storage device at all, a file system can be used to organise and represent access to any data, whether it be stored or dynamically generated (eg., from a network connection).

Computer System:

A computer system may be a type of processing system, terminal, computer or computerised device, personal computer (PC), mobile or cellular telephone, mobile data terminal, portable computer, Personal Digital Assistant (PDA), pager or any other similar type of device. The capability of such a computer system to process, request and/or receive information or data can be provided by software, hardware and/or firmware. A computer system may include or be associated with other devices, for example a local data storage device such as a hard disk drive or solid state drive. A computer with a rootkit is sometimes called a rooted computer.

There is a need for a method, system, computer program product and/or computer readable medium of instructions which addresses or at least ameliorates one or more problems inherent in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

DISCLOSURE OF INVENTION

In a particular embodiment, the present method/system bypasses a rootkit filter program and obtains notification information directly from an operating system whenever a process or a module is loaded or unloaded in the operating system. A Direct Process Access (DPA) engine can be used which maintains its own database, thereby keeping track of current notification information, for example currently loaded processes and modules in the processing system. Other types of notification information from the operating system could be similarly obtained. A scanning engine or security program can send a process and module list request to the DPA engine which returns a current process and module list (or lists) retrieved from the DPA engine database.

According to a first broad form, the present invention provides a method of obtaining notification information about the state of an operating system, the method comprising the steps of: receiving, by a Direct Process Access (DPA) engine, a request for the notification information from a requesting program; obtaining the notification information from a database associated with the DPA engine; and, providing the notification information to the requesting program. The DPA engine can receive update information indicative of changes in the notification information directly from the operating system and cause the notification information to be updated in the database.

According to a second broad form, the present invention provides a computer program product for obtaining notification information about the state of an operating system, the computer program product including a Direct Process Access (DPA) engine configured to: receive a request for the notification information from a requesting program; obtain the notification information from a database associated with the DPA engine; and, provide the notification information to the requesting program. The DPA engine can receive update information indicative of changes in the notification information directly from the operating system and cause the notification information to be updated in the database.

According to a third broad form, the present invention provides a system for obtaining notification information about the state of an operating system, the system comprising: at least one memory to store a database; and, a processor, in communication with the at least one memory, the processor configured to: (a) receive a request for the notification information from a requesting program; (b) obtain the notification information from the database; and, (c) provide the notification information to the requesting program. The processor can receive update information indicative of changes in the notification information directly from the operating system and cause the notification information to be updated in the database.

According to various non-limiting forms: the notification information is a process and/or module list; and/or the update information is indicative of a change in a process and/or a module.

In particular example forms, the change is one or more of: process loading; process unloading; module loading; module unloading; process creation; process deletion; module creation; and/or module deletion.

Preferably, though not necessarily, the DPA engine is a kernel driver.

According to further various but non-limiting forms: the request is sent using a DeviceIoControl( ) Win32 API; the operating system provides the update information as including a process ID and a flag; and/or the flag is indicative of at least one of: process loading; process unloading; process creation; and process deletion.

According to still further various but non-limiting forms: the operating system provides the update information as including a module name and pathway and associated process ID if available; the notification information is stored in the database as two or more hash tables; a first hash table is representative of processes currently running in the operating system, each process referenced by a process ID; a second hash table is representative of modules currently loaded in the operating system; contents of the first hash table and the second hash table are mapped.

Preferably, though not necessarily, the requesting program is one or more of: a scanning engine; an application; a security program; and anti-malware software.

In accordance with a specific optional embodiment, provided by way of example only, the scanning engine and/or the direct process access engine is one or more of, separately or in combination, a program, a driver or an application. Optionally, but not necessarily, the direct process access engine is one or more kernel driver.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

Processing System

Figure 1:
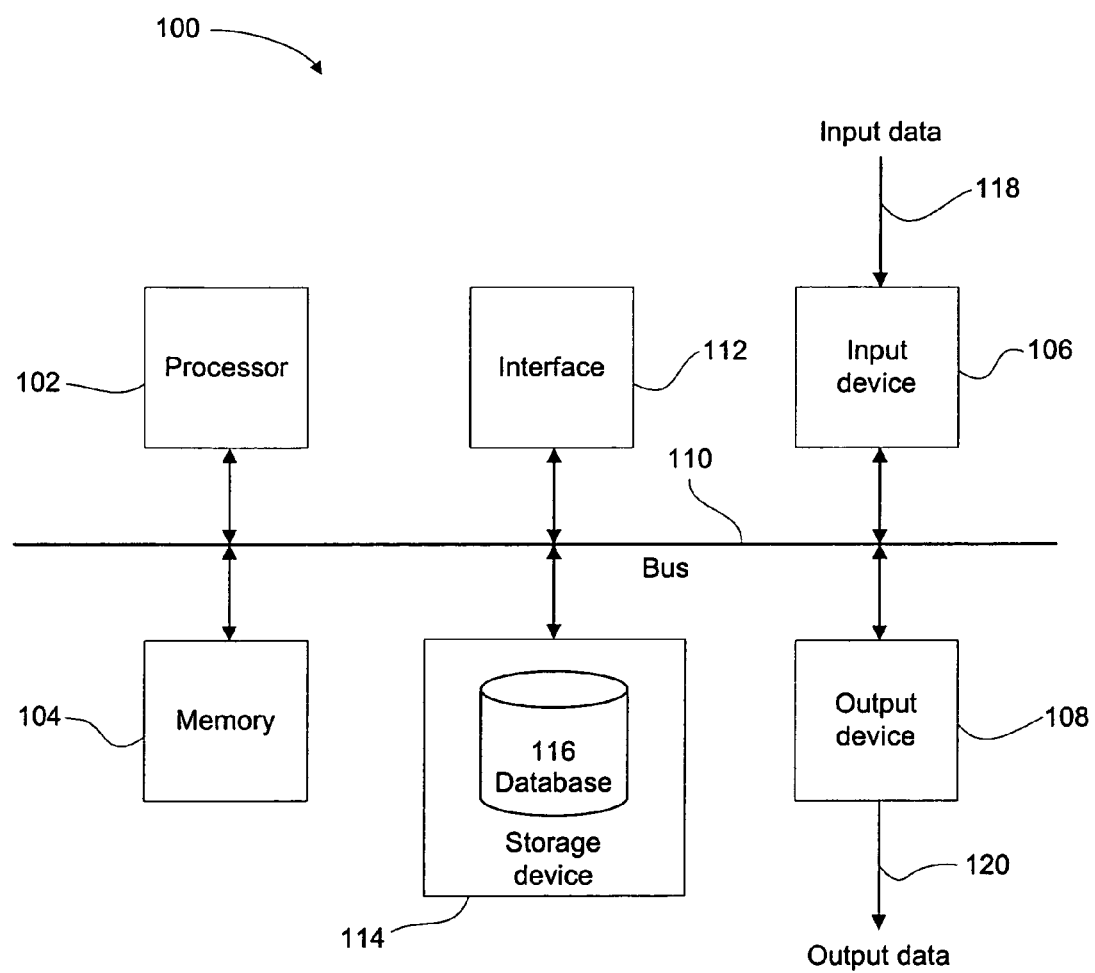
FIG. 1 illustrates an example functional block diagram of a processing system that can be utilised to embody or give effect to a particular embodiment.

A particular embodiment of the present invention can be implemented on a computer system, or more generally a processing system, an example of which is shown in FIG. 1. In particular, processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling processing system 100 to one or more peripheral devices, for example interface 112 could be a PCI card or PC card. At least one storage device 114 which houses at least one database 116 can also be provided. Memory 104 can be any form of memory device, for example, volatile or non-volatile memory, solid state storage devices, magnetic devices, etc. Processor 102 could include more than one distinct processing device, for example to handle different functions within processing system 100.

Memory 104 typically stores an operating system to provide functionality to processing system 100. A file system and files are also typically stored on storage device 114, and/or perhaps memory 104.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. Storage device 114 can be any form of data or information storage means or store, for example, volatile or non-volatile memory, a hard disk drive, solid state storage devices, magnetic devices, etc.

In use, processing system 100 is adapted to allow data or information to be stored in and/or retrieved from, via wired or wireless communication means, the at least one database 116. Interface 112 may allow wired and/or wireless communication between the processing unit 102 and peripheral components that may serve a specialised purpose. The processor 102 may receive instructions as input data 118 via input device 106 and can display processed results or other output to a user by utilising output device 108. More than one input device 106 and/or output device 108 can be provided. It should be appreciated that processing system 100 may be any form of terminal, server, specialised hardware, computer, computer system or computerised device, personal computer (PC), mobile or cellular telephone, mobile data terminal, portable computer, Personal Digital Assistant (PDA), pager or any other similar type of device.

Prior Art System Explanation

Figure 2:
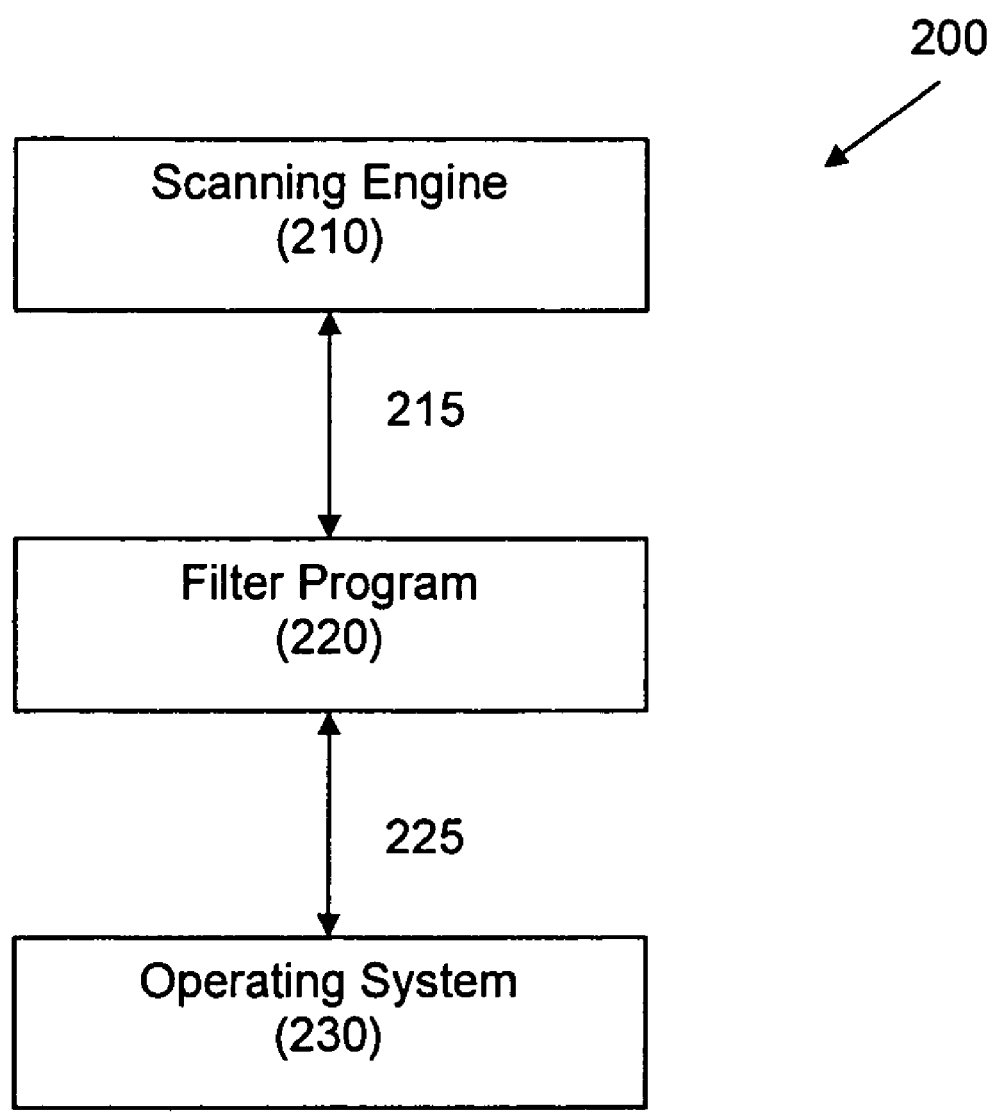
FIG. 2 (prior art) illustrates how a filter program can compromise a process and module list returned by an operating system after a request from a scanning engine.

Referring to FIG. 2 (prior art), there is illustrated a simplified summary of the steps required to scan an operating system using a currently known security method 200. FIG. 2 illustrates how a filter program 220 (eg. part of a rootkit) can compromise a process and module list returned by an operating system 230 after a request 215 from a scanning engine 210. These steps are as follows:

1. Scanning engine (i.e. program(s) or application(s)) 210 sends a request 215 to operating system 230.
   a. Request 215 sent by scanning engine 210 may be sent directly to operating system 230.
   b. Alternatively, request 215 sent by scanning engine 210 may be transferred to intermediate filter program 220 which then produces request 225 to be sent to operating system 230.
2. Filter program 220 can thus obtain control and pass control to operating system 230.
   a. Filter program 220 may take one of the following actions.
      i. Forward request 215 to another filter program either in user mode or kernel mode.
      ii. Forward request 215, as request 225, to operating system 230, in which case filter program 220 may return forged information to scanning engine 210 when operating system 230 returns information.
      iii. Decline request 215.
   b. If another filter program receives control from filter program 220, then this other filter program may recursively perform step 2a.
3. When operating system 230 obtains control, operating system returns a process and module list 225.
   a. If in-memory code or data of operating system 230 was not altered by filter program 220, the process and module list 225, returned by operating system 230 may contain all processes and modules currently loaded in the computer.
   b. If in-memory code or data of operating system 230 was altered by filter program 220, the process and module list 225, returned by operating system 230 may contain a set of processes and modules different from those currently running the computer.

Thus, using known prior art systems/methods, such as illustrated in FIG. 2, currently running process lists and runtime module lists can be compromised by a filter program, thereby potentially allowing malware or threats to go undetected.

Direct Process Access Engine

Rootkits that hide malware processes are usually deployed as a filter program either in user mode or kernel mode to intercept the execution control. Once control is obtained, rootkits generally remove or hide the processes or modules from the returning list(s). Subsequently, an application program, such as a security scanning engine (eg. anti-malware software), that requested the process and module list receives the modified or forged information and the hidden malware guarded by the rootkits remains undetected.

Some of the process-hiding rootkits run in kernel mode and modify the operating system's code or data structures. Therefore, the process and module list returned from the operating system using system calls may not be correct.

In a particular embodiment, the present method/system bypasses any rootkit filter programs and receives returned notification information directly from the operating system whenever a process or a module is loaded and unloaded. For this reason, a Direct Process Access (DPA) engine is used and runs in the same privilege level as the operating system. The DPA engine maintains its own database, which may be an internal database, that keeps track of currently loaded processes and modules in the processing system by way of notification from the operating system on process/module loading and unloading. The scanning engine or security program sends a process and module list request to the DPA engine which returns a current process and module list(s) retrieved from the DPA engine database.

The scanning engine or security program communicates with the DPA engine without being directly connected to the nature of the request to the DPA engine so that rootkits do not recognize the attempt to obtain the process and module list(s).

Figure 3:
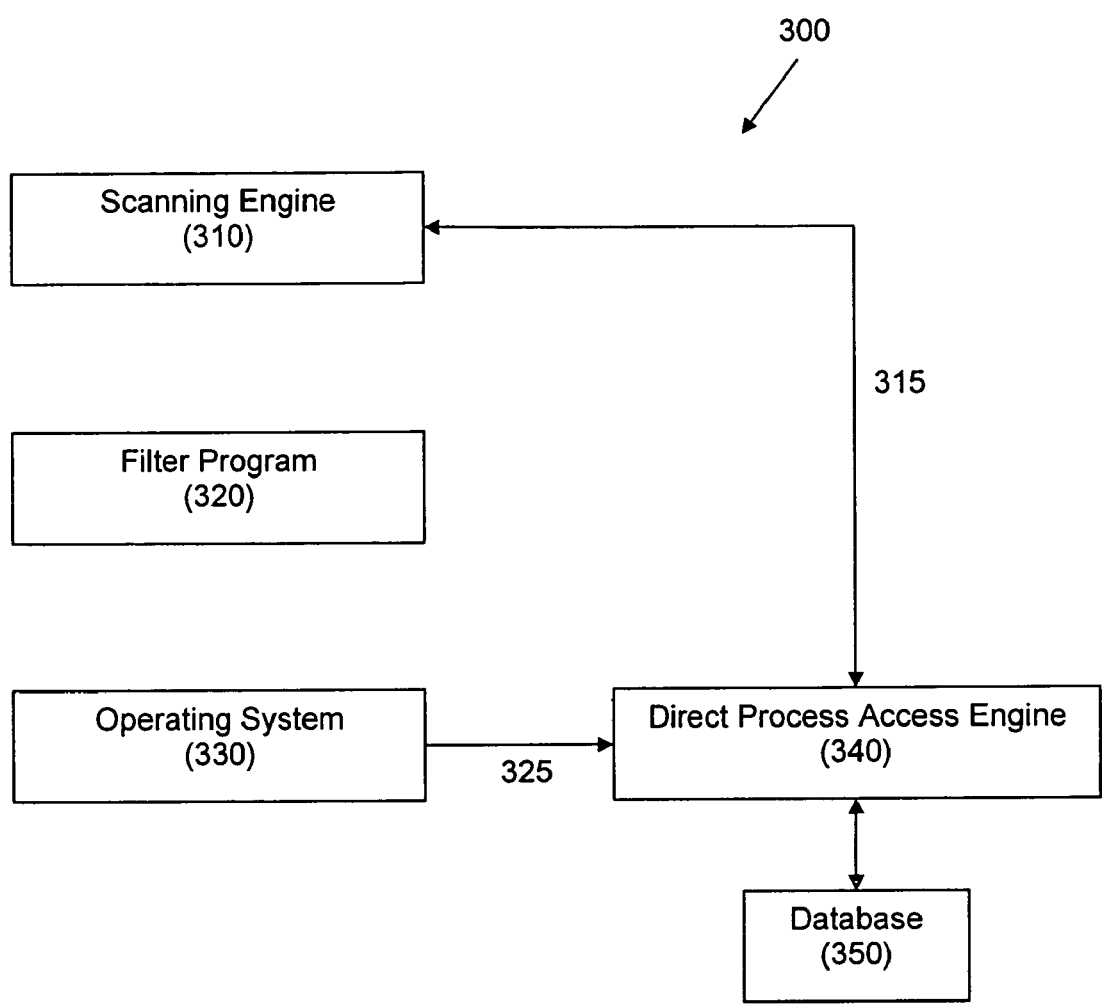
FIG. 3 illustrates an example method of avoiding a filter program.

A particular example embodiment of the present invention is now described with reference to FIG. 3, which illustrates a method 300 to obtain information from an operating system(s). These steps of method 300 are as follows:

1. Scanning engine (i.e. program(s) or application(s)) 310 sends request 315 to DPA (Direct Process Access) engine (i.e. program(s) or application(s)) 340 and receives information from DPA engine 340.
   A. Request 315 sent by scanning engine 310 is sent to DPA engine 340 via a path that is preferably not associated with the nature of the request.
   B. Request 315 sent by scanning engine 310 is transferred to DPA engine 340, bypassing any filter program(s) 320.
   C. DPA engine 340 returns information back to scanning engine 310, bypassing any filter program(s) 320.
2. Operating system 330 notifies DPA engine 340 in the event that a process or module is created or deleted and this information is stored in database 350.
   A. DPA engine 340 registers callback functions to obtain this notification 325 in such a way that any filter program(s) 320 do not receive program control during this procedure.
3. The notification information 325 registered to operating system 330 by DPA engine 340 includes, but is not limited to:
   A. Process Create
   B. Process Delete
   C. Module Create
   D. Module Delete DPA engine 340 can be implemented as a DPA kernel driver to obtain unmodified or undisturbed event notifications from the operating system 330 and secure the DPA engine's own code and data.

In a specific, non-limiting, example applied to the Windows® operating system, PsSetCreateProcessNotifyRoutine( ) is used to register the DPA kernel driver to the operating system in order to receive notification when processes are created or deleted. The operating system provides a process ID and a flag indicating whether a process is created or deleted once the event occurs. In addition, the DPA kernel driver calls PsSetLoadImageNotifyRoutine( ) OS function to be signaled on module load. The information provided by the operating system on module load includes module name (path inclusive) and the associated process ID if it exists. The notification events triggered by these two OS functions can not be intercepted by any user mode or kernel mode programs due to the design of the OS.

The DPA kernel driver creates two internal hash tables on the fly based on the notifications from the operating system. The two internal hash tables may be stored as part of database 350. One of the internal hash tables is used to keep all currently running process information, using process ID as keys, and the other internal hash table is used to hold all loaded module information. Using the process ID, the DPA kernel driver can construct a mapping between the process ID and the module name associated with the process ID.

In a further specific, non-limiting, example applied to the Windows® operating system, OS functions used by the DPA engine are not directly related to the nature of the process/module snapshot request. For example, a known scanning engine 210 normally uses CreateToolhelp32Snapshot( ) Win32 API to take snapshots of processes and modules, which may be compromised by filter program 220. However, using a DPA interface, scanning engine 310 can use DeviceIoControl( ) Win32 API to send a request 315 to DPA engine 340, in this case a DPA kernel driver running in kernel mode. Therefore, any user mode filter program(s) 320 is unable to detect this action. When DPA kernel driver 340 receives DeviceIoControl( ) Win32 API (as request 315), DPA kernel driver 340 looks up its internal hash tables and returns a process list and module list.

The present invention may be implemented separately as stand-alone software or in combination with currently known systems/methods as a software package. When the present invention is embodied as a software package, this software package can be used to detect and remove malware, guarded by a rootkit, from a processing system or device, such as a computer, computer system, PDA, mobile or cellular telephone, or a wide variety of other similar devices.

Whilst an example embodiment has been described with reference to the Microsoft Windows® operating system, the present invention can be readily applied to many other operating systems and should not be considered to be limited only to the Microsoft Windows® operating system.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The present invention may take the form of an entirely hardware embodiment, an entirely software embodiment, or an embodiment combining software and hardware aspects.

The invention claimed is:

1. A method of obtaining notification information about the state of an operating system, the method comprising the steps of:
    (1) receiving, by a Direct Process Access (DPA) engine, a request for the notification information from a requesting program;
    (2) obtaining the notification information from a database associated with the DPA engine, wherein the notification information is stored in the database as two or more hash tables; and,
    (3) providing the notification information to the requesting program;
wherein, the DPA engine receives update information indicative of changes in the notification information directly from the operating system and causes the notification information to be updated in the database.

2. The method as claimed in claim 1, wherein the notification information is a process and module list.

3. The method as claimed in claim 1, wherein the update information is indicative of a change in a process or a module.

4. The method as claimed in claim 3, wherein the change is one or more of: process loading; process unloading; module loading; module unloading; process creation; process deletion; module creation; and module deletion.

5. The method as claimed in claim 1, wherein the DPA engine is a kernel driver.

6. The method as claimed in claim 5, wherein the request is sent using a DeviceIoControl( ) Win32 API.

7. The method as claimed in claim 1, wherein the operating system provides the update information as including a process ID and a flag.

8. The method as claimed in claim 7, wherein the flag is indicative of at least one of: process loading; process unloading; process creation; and process deletion.

9. The method as claimed in claim 1, wherein the operating system provides the update information as including a module name and pathway and associated process ID if available.

10. The method as claimed in claim 1, wherein a first hash table is representative of processes currently running in the operating system, each process referenced by a process ID.

11. The method as claimed in claim 10, wherein a second hash table is representative of modules currently loaded in the operating system.

12. The method as claimed in claim 11, wherein contents of the first hash table and the second hash table are mapped.

13. The method as claimed in claim 1, wherein the requesting program is one or more of: a scanning engine; an application; a security program; and anti-malware software.

14. The method as claimed in claim 1, wherein the DPA engine has the same privilege level as the operating system.

15. A computer program product for obtaining notification information about the state of an operating system, the computer program product comprising a non-transitory computer-readable storage medium having instructions thereon, the instructions comprising:
    (1) code programmed to receive, at a Direct Process Access (DPA) engine, a request for the notification information from a requesting program;
    (2) code programmed to obtain the notification information from a database associated with the DPA engine, wherein the notification information is stored in the database as two or more hash tables; and,
    (3) code programmed to provide the notification information to the requesting program; wherein, the DPA engine receives update information indicative of changes in the notification information directly from the operating system and causes the notification information to be updated in the database.

16. The computer program product as claimed in claim 15, wherein the DPA engine is a kernel driver.

17. A system for obtaining notification information about the state of an operating system, the system comprising:
    (1) at least one memory to store a database; and,
    (2) a processor, in communication with the at least one memory, the processor configured to:
        (a) receive a request for the notification information from a requesting program;

(b) obtain the notification information from the database, wherein the notification information is stored in the database as two or more hash tables; and, (c) provide the notification information to the requesting program;

wherein, the processor receives update information indicative of changes in the notification information directly from the operating system and causes the notification information to be updated in the database.

18. The system as claimed in claim 17, wherein the operating system provides the update information as including a process ID and a flag.

19. The system as claimed in claim 18, wherein the flag is indicative of at least one of: process loading; process unloading; process creation; and process deletion.

* * * * *